United States Patent

Forney, Jr.

[15] 3,652,998

[45] Mar. 28, 1972

[54] INTERLEAVERS

[72] Inventor: George David Forney, Jr., Lexington, Mass.

[73] Assignee: Codex Corporation, Watertown, Mass.

[22] Filed: Mar., 1970

[21] Appl. No.: 17,417

[52] U.S. Cl. .......... 340/172.5

[51] Int. Cl. .......... G06f 13/02, G06f 7/00

[58] Field of Search .......... 340/172.5, 174.1, 347, 146.1; 325/41

[56] References Cited

UNITED STATES PATENTS

| | | | |
|---|---|---|---|
| 2,956,124 | 10/1960 | Hagelbarger | 340/146.1 X |
| 3,227,999 | 1/1966 | Hagelbarger | 340/146.1 |
| 3,235,661 | 2/1966 | Oxley et al. | 340/172.5 X |
| 3,335,409 | 8/1967 | Heller et al. | 340/172.5 |
| 3,340,514 | 9/1967 | Swift | 340/172.5 |
| 3,585,586 | 6/1971 | Harmon et al. | 340/146.1 |

OTHER PUBLICATIONS

W. Cowell et al., Computer Simulation of the Use of Group Codes with Retransmission on A Gilbert Burst Channel, A.I.E.E. Transactions- Part I, Communication & Electronics, No. 58, pp. 577- 585, Jan. 1962.

*Primary Examiner*—Paul J. Henon
*Assistant Examiner*—Sydney R. Chirlin
*Attorney*—John Noel Williams

[57] ABSTRACT

Interleavers, which spread the bits in a group of length B in the input sequence so that any pair are at least N bits apart in the output sequence, in which delaying circuitry (e.g., one or more shift registers) cooperates with control circuitry to define a plurality of delay paths, each of which is of constant length, the number of such paths being equal to the period, P, of the interleaver (where $2 \leq P < BN/2$). The control circuitry classifies any P successive bits of the input sequence to the P different delay paths, the bits being classified to any such path being spaced P bits apart. The output sequence is derived by sequentially selecting bits from the various delay paths.

17 Claims, 11 Drawing Figures

| TIME | CONTENTS | | | | DATA OUT |
|---|---|---|---|---|---|
| | STAGE 1 | STAGE 2 | STAGE 3 | STAGE 4 | |
| 0 | X | X | X | X | 0 |
| 1 | 1 | X | X | X | X |
| 2 | 2 | 1 | X | X | X |
| 3 | X | 2 | 1 | X | 3 |
| 4 | 4 | X | 2 | 1 | X |
| 5 | 5 | 4 | X | 2 | 1 |
| 6 | 2 | 5 | 4 | X | 6 |
| 7 | 7 | 2 | 5 | 4 | X |
| 8 | 8 | 7 | 2 | 5 | 4 |
| 9 | 5 | 8 | 7 | 2 | 9 |
| 10 | 10 | 5 | 8 | 7 | 2 |
| 11 | 11 | 10 | 5 | 8 | 7 |
| 12 | 8 | 11 | 10 | 5 | 12 |

INTERLEAVERS

This invention relates to interleavers.

As used herein an "interleaver" is a device which rearranges the order of the signals in an input sequence without changing their information values. In the following description I shall usually refer to the signals as bits, but it will be clear that any type of signal—groups of bits, analog values, letters, picture elements, etc.,—can be handled in an identical fashion.

Interleavers are used to randomize signal sequences whose statistics would otherwise be correlated. In particular, interleavers are used on digital information channels when errors in transmission tend to occur in clusters or bursts, and when one wishes to use an error-correcting device suitable for scattered or "random" errors.

A B×N interleaver is herein defined as an interleaver which ensures that the bits in any burst of B consecutive bits in the input sequence occur at least N bits apart in the output sequence. Normally the parameter B would be chosen as large as the maximum error burst to be encountered, and N larger than the "constraint length" or effective memory of the error-correcting device to be used. One interleaver, the transmit interleaver, interleaves bits before transmission; another interleaver, the receive interleaver, performs the inverse interleaving function on received bits.

In the prior art interleaving has typically been implemented in a block format. Incoming bits are laid down horizontally in an array of N rows of B bits each. The output sequence is constructed by reading bits out of the array vertically, column by column. The input sequence is thus effectively separated into blocks of BN bits, which are internally permuted to realize B×N interleaving. Such an interleaver is suitable for implementation in two arrays of magnetic cores or other memory devices of BN elements each, with each array being used alternately for input and output. (It is possible by adopting other input/output patterns and overlapping two blocks to reduce the required memory.)

According to the present invention I have realized that a different approach to interleaving leads to extremely simple and economic interleavers. These interleavers can be shown to be effectively optimum in performance while requiring the minimum amount of memory possible for a given amount of interleaving. Furthermore, preferred realizations of such interleavers can be implemented with long untapped segments of serial shift register memory, which is today the most inexpensive type of memory for memories of $10^4$–$10^5$ bits or less. Still further, the control circuitry for these interleavers is extremely simple, the receive interleaver control circuitry is easily synchronized with that in the transmit interleaver, and the interleavers mate conveniently with encoders and decoders resulting in a sharing of clocking and other system advantages.

To facilitate the discussion of the principles involved in interleavers according to the present invention, all of the examples presented will have a single input sequence and a single output sequence. It will be apparent to those skilled in the art, however, that, should other system considerations so dictate, interleavers according to my invention may be constructed with a plurality of input and/or output sequences. Therefore, in the description and claims which follow, I intend the singular expressions "input," "input sequence," "output," "output sequence," etc., to comprise the plurals as well.

In a broad aspect my invention comprises apparatus for interleaving an input sequence of information signals so that any two input signals separated by B or fewer signals shall be separated by N or more signals in the output sequence. The apparatus comprises control circuitry and delaying circuitry, of predetermined storage capacity, which cooperate to define a number of delay paths equal to a period P, where P is at least 2 and less than BN/2 intervals of said input sequence. Each of the delay paths is of constant length. The control circuitry is arranged to classify any P successive information signals respectively to the P different delay paths, with the signals classified to each path being spaced said period apart. There are also included means to deliver an output sequence of information signals derived from the various delay paths.

In another aspect, my invention comprises control circuitry and storage elements responsive to a sequence of input signals and an associated "clock," defining one time interval for each input signal. One output signal is put out at each time interval. According to the state of the control circuitry, a pattern of interconnections is established between the input line, the output line, and each of the internal storage elements. At the clock time, information is shifted according to these interconnections, and the control circuitry advances one state. The control circuitry cycles periodically through a total of P states, where P is at least 2 and less one-half BN, generally being approximately the minimum of B and N; the word "approximately" being intended herein to include the case where P is exactly equal to the minimum of B and N. (Considered in this light, the prior art block interleavers have periods of the order of the product BN.) The delay of an input signal in the interleaver is the number of time intervals before that signal appears at the output; in my invention there are only P different possible delays, and the signal arriving at any time receives the same delay as the signal which arrived P time intervals earlier.

These and other objects, features and advantages will be understood from the accompanying description.

IN THE DRAWINGS

FUNCTIONAL DESCRIPTION OF PERIODIC INTERLEAVERS

Figure 1:
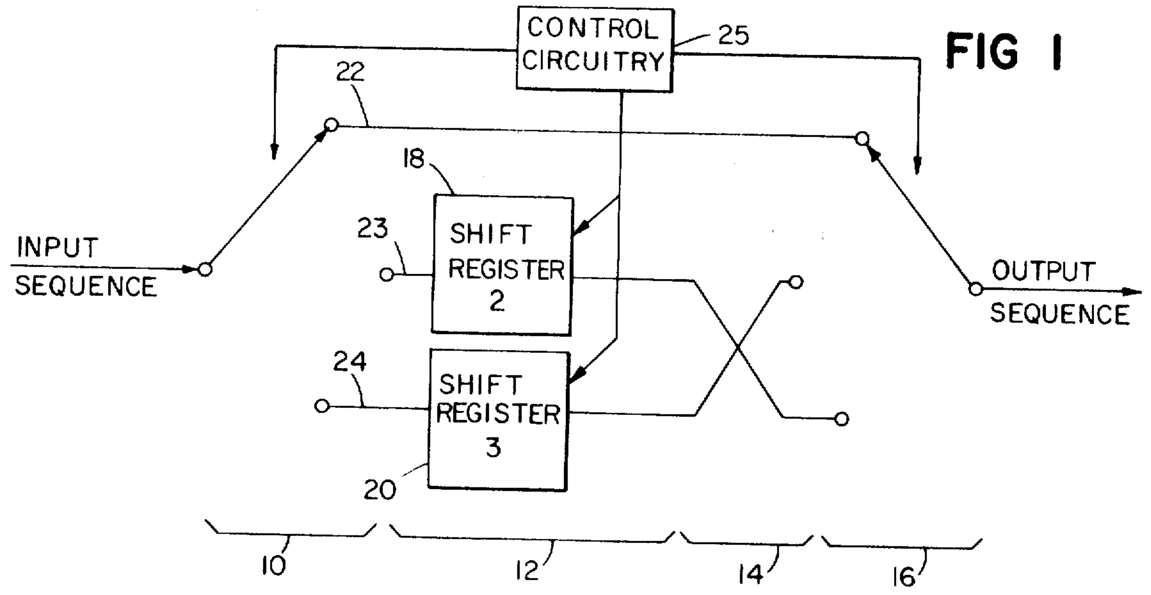
FIGS. 1 through 5 and FIG. 8 are schematic illustrations of alternative embodiments of interleavers constructed according to the invention.

Any interleaver may be completely described functionally by a list of the delays $d(0)$, $d(1)$,... given to the input bits at time 0, time 1, etc. The interleavers of my invention are periodic with period P, and therefore can be completely characterized by a set of P delays $d_0, d_1, \ldots, d_{P-1}$. Bits arriving at times 0, P, 2P,...receive delay $d_0$; bits arriving at times 1, P+1, 2P+1,...receive delay $d_1$; and in general a bit arriving at time $t$ receives delay $d_i$, where $i$ is the remainder when $t$ is divided by P (i.e., $t = i$ modulo P).

For example, let P be 3 and let $d_0 = 0$, $d_1 = 4$, $d_2 = 8$. Denote the sequence of input signals at time 0, time 1, time 2,...by their indices 0,1,2,...Then the permutation induced by this interleaver can be represented abstractly as follows, where the first line represents the input sequence and the second line represents the output sequence:

0 1 2 3 4 5 6 7 8 9 10 11 12 13 14 15 16 17 18 19 20 ...
0 . . 3 . 1 6 . 4 9 2 7 12 5 10 15 8 13 18 11 16 ...

(Note that there is no block structure, but that bits are continuously interleaved; in this respect my invention relates to the prior art interleavers as convolutional codes do to block codes.)

By inspection one can verify that an interleaver with these delays is a 2×5 interleaver; that is, any pair of consecutive input bits is spread at least five bits apart in the interleaved stream. It is also a 5×2 interleaver; that is, any five consecutive input bits are spread at least two bits apart in the interleaved stream. This interleaver is also its own inverse, in the sense that if its output sequence receives delays $d_0 = 8$, $d_1 = 0$, $d_2 = 4$ (the same delays shifted by two time units), the original sequence is recovered:

0 . . 3 . 1 6 . 4 9 2 7 12 5 10 15 8 13 18 11 16 ...
. . . . . . . . 0 1 2 3 4 5 6 7 8 9 10 11 12 ...

In general, a good choice for the delays of a periodic interleaver is the set of integers 0, D,..., (P−1)D in some order, where P is the period and D is a delay parameter. Regardless of the order, such an interleaver is at least a P×(D−P+1) interleaver, and also a (D−P+1)×P interleaver. For D moderately large compared to P, any such interleaver is nearly optimum in the following senses.

The period of any periodic B×N interleaver can be no less than the minimum of B and N, which is exactly met in this case.

The maximum delay is (P−1)D. The maximum delay of any B×N interleaver must be at least (B−1)(N−1) in general, or (P−1)(D−P) in this case.

The average delay is (P−1)D/2. The average delay of any B×N interleaver must be at least (B−1)(N−1)/2 in general, or (P−1)(D−P)/2 in this case. Any periodic interleaver can be realized with a number of memory elements equal to the average delay; hence the amount of memory needed to realize such an interleaver is nearly minimal.

The guard space G of a B×N interleaver is defined as the least integer such that the bits in any two B-bit bursts separated by G intermediate bits appear at least N bits apart in the output sequence. In general $G \geq B(N-1)$. If we consider an interleaver in this class as a P×(D−P+1) interleaver, then it has a guard space no greater than P(D−1), compared to the optimum P(D−P); if we consider it as a (D−P+1)×P interleaver, then it has guard space no greater than (P−1)(D+1), compared to the optimum (P−1)(D−P+1).

Certain orderings of the set of delays O, D,...,(P−1)D prove to have additional desirable properties. I shall describe two classes of orderings, the modular type and the cascade type.

MODULAR PERIODIC INTERLEAVERS

The modular type of interleaver is specified by three parameters; P, D, and $m$, and is compactly denoted as a (P, D, $m$) interleaver. Here P is the period and D is the delay parameter introduced earlier, while $m$ is a new parameter with the properties 1. $1 \leq m \leq P-1$;
2. P and $m$ are relatively prime (have no common factor);

as a (P−1)×($D$+1), $P$×($D$−1), ($D$−1)×$P$, or ($D$+1)×($P$−1) interleaver, respectively, in the sense that no other B×N interleaver with the same B and N has less average delay.)

5. The guard space G of a ($P$, $D$, $m$) interleaver used as a B×N interleaver is the greatest integer congruent to $m^{-1}$ modulo $P$ such that $G \leq (P-1)D+N-1$.
6. The inverse of a ($P$,$D$, $m$) interleaver is a ($P$,$D$,$n$) interleaver. A ($P$, $D$, $m$) interleaver is therefore its own inverse whenever $n=m$, or $mD \equiv -2$ modulo $P$.
7. Simple and economical realizations are possible, as will be demonstrated in a later section.

CASCADED PERIODIC INTERLEAVERS

The cascade type of interleaver is built up from two or more component interleavers. I shall describe the construction for the case of two components. Extensions to higher numbers of components will be apparent to those skilled in the art.

Let P be a composite number equal to a product $P_1P_2$. Any integer $k$ less than P then has a unique decomposition $k=iP_1+j$ where $0 \leq i \leq P_2-1$ and $0 \leq j \leq P_1-1$. If one component interleaver imparts delays of $iP_1D$, $0 \leq i \leq P_2-1$, and a second imparts delays of $jD$, $0 \leq j \leq P_1-1$, and further the delays are ordered so that in $P$ time intervals all possible combinations occur, then the cascade of the two interleavers realizes all delays $kD$, $0 \leq k \leq P-1$, in a period of $P$.

Exactly how to accomplish this depends on the values of $P_1$ and $P_2$. If $P_1$ and $P_2$ are relatively prime, then a simple cascade of a period $P_2$ interleaver with delays $iP_1D$ and a period $P_1$ interleaver with delays $jD$ will suffice. If $P_1$ and $P_2$ have a greatest common divisor $a$ greater than 1, then let $b$ be the smallest integer such that the least common multiple of $bP_2$ and $P_1$ is $P$. (Example: $P$= 24; $P_1$=4, $P_2$=6; $a$=2, $b$=4.) Then the first interleaver must operate as a $b$-bit symbol interleaver, meaning it must give the same delays to all bits in a group of $b$ consecutive bits. The period of the second interleaver is still $P_1$, with delays $jD$, $0 \leq j \leq P_1-1$.

Example: With $P$=24; $P_1$=4, $P_2$=6; $a$=2, $b$=4; and where the three rows of numbers represent the number of delays (divided by $D$) which each bit receives in the first interleaver, the second interleaver, and the cascaded interleaver as a whole, respectively:

| | | | | | | | | | | | | | | | | | | | | | | | |
|---|---|---|---|---|---|---|---|---|---|---|---|---|---|---|---|---|---|---|---|---|---|---|---|
| 0 | 0 | 0 | 0 | 4 | 4 | 4 | 4 | 8 | 8 | 8 | 8 | 12 | 12 | 12 | 12 | 16 | 16 | 16 | 16 | 20 | 20 | 20 | 20 |
| 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

and

3. P and $m$D+1 are relatively prime.

Example: With $P$=24; $P_1$=6; $P_2$=4; $a$=2; $b$=2; the ordering of delays is changed to:

| | | | | | | | | | | | | | | | | | | | | | | | |
|---|---|---|---|---|---|---|---|---|---|---|---|---|---|---|---|---|---|---|---|---|---|---|---|
| 0 | 0 | 6 | 6 | 12 | 12 | 18 | 18 | 0 | 0 | 6 | 6 | 12 | 12 | 18 | 18 | 0 | 0 | 6 | 6 | 12 | 12 | 18 | 18 |
| 0 | 1 | 2 | 3 | 4 | 5 | 0 | 1 | 2 | 3 | 4 | 5 | 0 | 1 | 2 | 3 | 4 | 5 | 0 | 1 | 2 | 3 | 4 | 5 |
| 0 | 1 | 8 | 9 | 16 | 17 | 18 | 19 | 2 | 3 | 10 | 11 | 12 | 13 | 20 | 21 | 4 | 5 | 6 | 7 | 14 | 15 | 22 | 23 |

Let $r_0, r_1, \ldots, r_{P-1}$ be the remainders of 0$m$, 1$m$, 2$m$,..., ($P$−1)$m$ when divided by $P$ (i.e., $r_i \equiv im$ modulo $P$). When condition 2 is satisfied, these integers are simply the set 0, 1, 2,..., $P$−1 in some order. The delays $d_i$ of a ($P$, D, $m$) interleaver are then $r_0$D, $r_1$D,...,$r_{P-1}$D; thus a ($P$, D, $m$) interleaver falls within the general class described above. The third condition is necessary and sufficient to avoid two bits being scheduled to be put out of the interleaver at the same time.

The example given earlier is now seen to be a (3,4,1) interleaver.

Parameters $m^{-1}$, $n$, and $m^{-1}$ are now defined as the integers in the range 0 to P−1 which solve the congruences $mm^{-1} \equiv 1$ modulo $P$;

$n(mD+1) \equiv -m$ modulo $P$; and $nn^{-1} \equiv 1$ modulo $P$.

(In the example, $m^{-1}=n=n^{-1}$=1.) With these definitions ($P$, $D$, $m$) interleavers have the following properties:

1. A ($P$, $D$, $m$) interleaver is a $(P-m^{-1})\times(D+m^{-1})$ or a $P\times(D-P+m^{-1})$ or a $(D-P+n^{-1})\times P$ or a $(D+n^{-1})\times(P-n^{-1})$ interleaver.
2. The period is $P$.
3. The maximum delay is ($P$−1)$D$.
4. The average delay is ($P$−1)$D$/2. (If $m^{-1}$ or $n^{-1}$ equals 1 or $P$−1, then a ($P$, $D$, $m$) interleaver is optimum when used Cascaded interleavers are not only simple in implementation, but to some extent may allow increased protection against shorter or longer bursts. For example, the interleaver in the second example immediately above not only spreads 24-bit bursts approximately $D$ time units apart, but in a more ragged way spreads 8-bit bursts approximately 3$D$ time units apart, on the average.

The specific classes of interleavers which I have described are representative of useful classes of interleavers according to my invention, but do not exhaust such classes. Other types of short-period interleavers may be suitable for particular applications. For example, the general class of interleavers with delays 0, $D$,..., ($P$−1)$D$ and particularly the ($P$, $D$, $m$) interleavers are susceptible to periodic interference for certain periods, and would be undesirable in applications where intelligent interference (jamming) is expected; slight jittering of the delays to $j_0$, $D+j_1$,..., $(P-1)D+j_{P-1}$, where the $j_i$ are small integers, can greatly alleviate this susceptibility. (To facilitate the reference in a single expression to both the case where the delay paths are exactly 0, $D$, 2$D$,..., ($P$−1)$D$ in some order and the case where they are $j_0$, $D+j_1$, $2D+j_2$,..., $(P-1)D+j_{P-1}$, as used herein the phrase "delay paths are approximately equal to 0, $D$, 2$D$,..., ($P$−1)$D$" is intended to comprise the case where the delay paths are exactly equal to 0, $D$, 2$D$,..., ($P$−1)$D$.)

SYNCHRONIZATION

In a communications system the receive interleaver must be in the proper phase with respect to the transmit interleaver in order to execute the inverse interleaving function. That is, for all but one of the $P$ possible synchronizations of the receive interleaver, the original sequence will not be reconstructed. If $P$ is not large and if the original sequence has some internal structure (as when it is encoded) which can be checked at the receiver, then a simple synchronization procedure is to try each of the possible $P$ phases in turn and check the reconstructed output for the known internal structure until the correct phasing is found. Such checking must be capable of distinguishing between actual channel errors and "errors" caused by false synchronization which reconstructs the sequence correctly in $P-1$ out of every $P$ places, for example. Nonetheless this procedure will generally be simpler than that required by the prior art, where, because of the large number of possible synchronizations in the block format, special additional synchronizing information must normally be transmitted.

IMPLENTATION

Convolutional, periodic interleavers according to the invention are readily realized using shift registers, whereas block interleavers are naturally realized with magnetic core arrays. Semiconductor (MOSFET) technology is producing very inexpensive long untapped shift registers with which memories of $10^4$–$10^5$ bits can generally be made more cheaply than with magnetic cores. This technology places a premium on a design with as few long shift register segments as possible, and on the use of segments of uniform length. Subsidiary requirements are that the shift rate be neither too fast (greater than 1-5 MHz., say), nor too slow (less than 1-10 kHz.).

Since it is possible to realize benefits while using core arrays to construct an interleaver according to my invention, the references herein to delay *paths* should be understood to include cases where the delayed signals are *not* shifted between storage elements during the time of delay.

In this section I shall give several ways of realizing the periodic interleavers described above. I shall first outline general embodiments for any periodic interleaver. I shall then describe particularly elegant and economical realizations for certain ($P$, $D$, $m$) interleavers. Finally, I shall illustrate a cascade interleaver. Wherever possible parameters of the example used earlier will be employed for illustration.

One general realization is illustrated in FIG. 1. It is based on the following observations. Each delay $d_i$ is equal to some multiple, $q_iP$, of $P$ plus a remainder term $r_i$; where $0 \leq r_i \leq P-1$. Thus, $$d_i = q_iP + r_i.$$

Let the input sequence be thought of as consisting of groups of $P$ bits; then such a delay can be thought of as first moving a bit ahead $q_i$ groups, without changing its position within a group, and then moving it ahead an additional $r_i$ bits, thus dropping it in a new position in that group or the next group. The latter case will occur if $i+r_i \geq P$; in that event define $$q_i' = q_i + 1$$
$$r_i' = (P - r_i)$$

and again $$d_i = q_i'P + r_i'$$

but now for negative $r_i$. For example, if $P=3$, $d_0=0$, $d_1=4$, $d_2=8$; then:

$$q_0=0,\ r_0=0;$$
$$q_1=1,\ r_1=1;$$
$$q_2'=3,\ r_2'=-1.$$

A straightforward realization of these delays can then be achieved by cascading the following elements (the numbers refer to FIG. 1 which illustrates such a realization of the example interleaver):

1. a commutator 10 dividing the input sequence into $P$ parallel subsequences, or, equivalently, a serial-to-parallel converter;
2. a set 12 of $P$ shift registers of length $q_i$ or $q_i'$, each shifted once every $P$ bits, where one shift register may in general have length zero (90=0), as in the example;
3. a permutator 14 which permutes the outputs of the shift registers according to the remainders $r_i$ or $r_i'$; and
4. a commutator 16 reforming the subsequences into one serial output sequence, or a parallel-to-serial converter. (Note: besides the shift registers, there is some implicit delay in the permutation operation.)

The set 12 of shift registers includes registers 18 and 20. Three delay paths 22, 23, 24 are therefore defined, the paths 23 and 24 incorporating registers 18 and 20 respectively. Control circuitry 25 clocks registers 18 and 20 once every three data bits.

Figure 2:
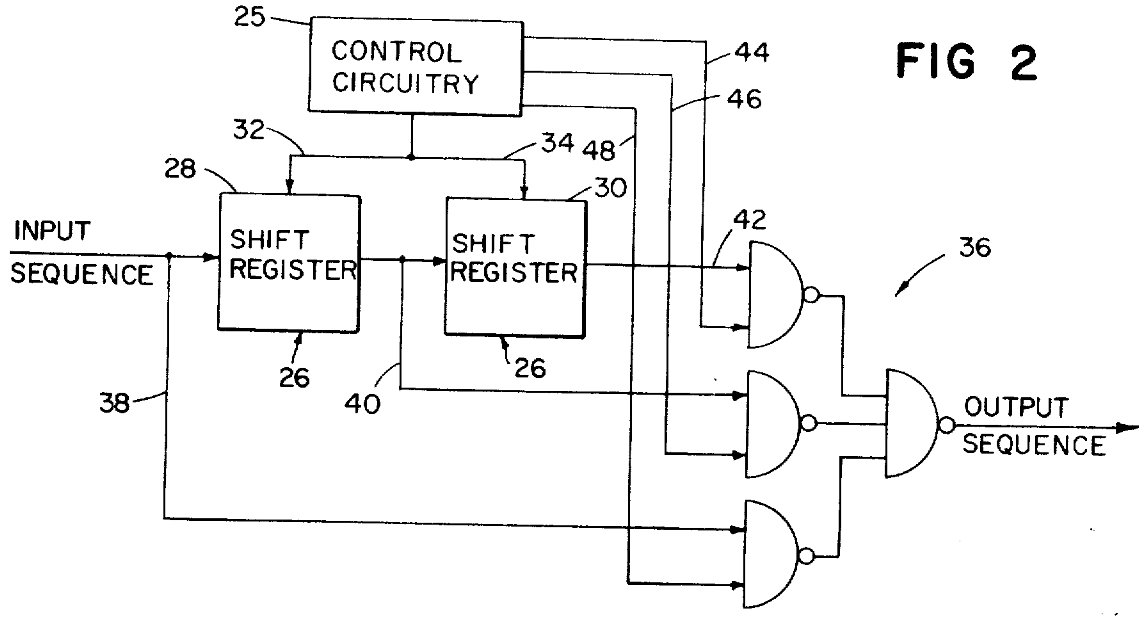
Figure 3:
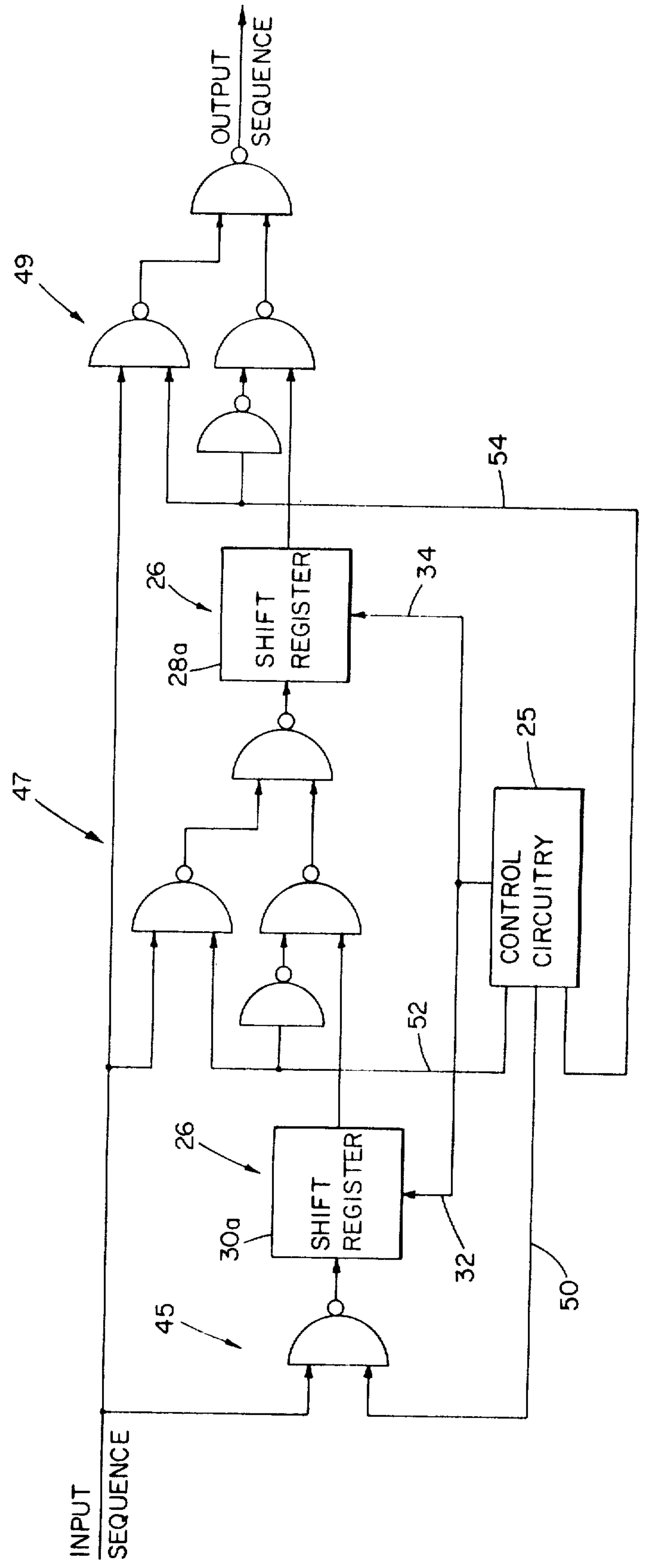

Another set of alternatives is illustrated in FIGS. 2 and 3. In general, incoming data can be fed into one long shift register of length $d_{max}=\max(d_i)$, which has taps at locations $d_0,\ldots, d_i,\ldots, d_{P-1}$, and which is clocked at the incoming data rate. The output then can be formed by picking off data from these taps in an appropriate order (FIG. 2). Alternatively, signals of the incoming information squence can be entered into the shift register at the tap locations and shifted out serially (FIG. 3).

In FIGS. 2 and 3 the "one long shift register of length $d_{max}$" 26 comprises separate segments 28 and 30 (30a and 28a in FIG. 3) of untapped shift registers which are connected in series with provision for insertion or removal of information signals at locations adjacent either end of each register. The control circuitry 25 clocks registers 28 and 30 (or 30a and 28a) at the incoming signal rate as indicated schematically by lines 32 and 34.

As shown in FIG. 2, the input sequence enters the "one long shift register" 26 at one location, the extreme left position, only. Gating 36 is provided which creates an output information signal sequence by sequentially passing signals which have been tapped from three different locations. These locations are: first, prior to the shift register 28 (see line 38); second, after shift register 28 (line 40); and third, after shift register 30 (line 42). Lines 44, 46, and 48 supply control pulses to gating 36 which are generated by control circuitry 25 and which control the sequential selection of signals for the output sequence.

The interleaver of FIG. 3 achieves the identical interleaved output signal sequence as the interleaver of FIG. 2. The insertion of signals from the input sequence into the complete shift register string 26 at different points requires that shift register 30a be of the same length as shift register 30 of FIG. 2 and that shift register 28a be of the same length as shift 28 of FIG. 2. The gating 45, 47, 49 required for proper insertion of each input signal into the appropriate place of the shift register string 26 is controlled by control pulses delivered from control circuitry 25 on lines 50, 52, and 54, respectively.

As a concrete example of the $P=3$ interleavers illustrated in FIGS. 2 and 3, we may consider shift registers 28 and 28a to have four stages and shift registers 30 and 30a to have four stages. With these values it is apparent that $d_0=0$, $d_1=4$, $d_2=8$.

The interleavers in FIGS. 2 and 3 are somewhat wasteful of storage capacity, however, since they both use $d_{max}$ rather than the average delay. If the control circuitry 25 is modified so that when a signal is taken off at a tap $d_i$ only the signals to the left of that tap are shifted, substantial savings in shift register capacity are achieved. The registers then need contain only those bits which have not yet been tapped off; that is, the total register capacity will be equal to the average delay of the interleaver. With this change in control circuitry and shifting stategy, the capacities of shift registers 28 and 30 (or 28a and 30a) for the concrete examples given above are reduced to 3 and 1, respectively.

Interleavers of period $P$ whose delays are 0, $D$,..., $(P-1)D$ are particularly suitable for embodiments such as are shown in FIGS. 2 and 3 without the control modification, since then all shift registers are of equal capacity (i.e., $D$). For the general interleaver, the efficiency of the FIG. 1 or FIGS. 2 and 3 embodiments with the control modification will be preferred. The main difference between FIG. 1 embodiment and FIGS.

2-3 embodiments is that in the latter instances bits are clocked at the data rate, while in the former they are clocked at the data rate divided by $P$.

A particularly elegant implementation for the class of self-inverse $(P, D, m)$ interleavers will now be considered. (Recall that such an interleaver is self-inverse if, and only if, $mD \equiv -2 \bmod P$.) The cases of odd and even $P$ will be treated separately.

Figure 4:
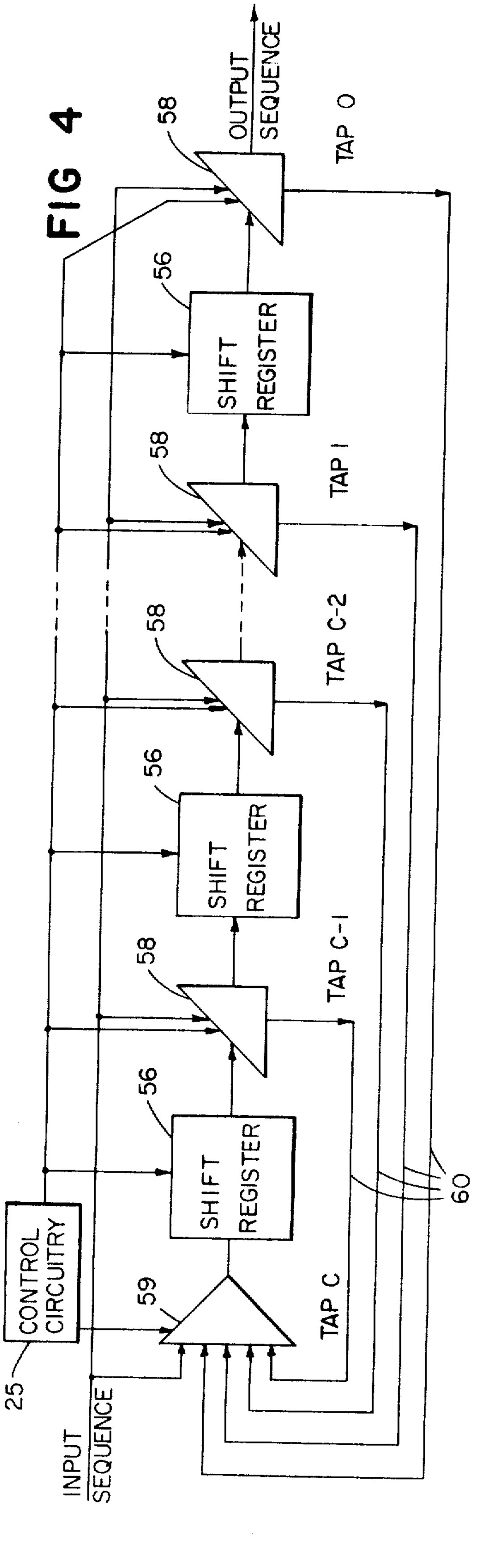

First let $P$ be odd. In this case the average delay $(\frac{1}{2})(P-1)D$ is an even multiple, $cD$, of $D$, where we define $c=(P-1)/2$. The interleaver has memory arranged as $c$ $D$-bit shift registers 56, as shown in FIG. 4. There are thus $c+1$ taps, (which may be considered, from left to right, as tap $c$, tap $c-1$,..., tap 0). A period-$P$ counter (not shown) marks the times $t \equiv T \bmod P=0,..., P-1$. All registers 56 are clocked at the incoming signal rate. Gating units 58 and 59 at each of the taps execute the following rules at any time $t$.

1. If $mt \bmod P \geq c$, the new signal enters at $c$.
2. If $mt \bmod P<c$, the new signal enters at tap $mt \pmod P$, while the signal emerging at tap $mt \bmod P$ is rerouted to tap $c$ again via feedback loops 60.
3. The output sequence signal is always taken from tap 0; at time $t=0$ this means that the current input signal is passed directly out, while the signal emerging at tap 0 is rerouted to tap $c$.

Each gating unit 58 comprises a combinational switching circuit constructed such that when $mt$ equals the tap number mod $P$, the signal emerging from the preceding register 56 is transferred to a feedback loop 60 and the current input sequence signal is passed to the succeeding register 56. When $mt$ does not equal the tap number mod $P$, the signal emerging from the preceding register is passed to the succeeding register. Gating unit 59 comprises a combinational switching circuit constructed such that its output is the signal fed back from tap $mt \pmod P$ for $mt \bmod P \leq c-1$ and is the current input sequence signal otherwise.

One skilled in the art may, with the aid of some modular arithmetic, verify that with these rules the implementation of FIG. 4 indeed realizes a $(P, D, m)$ interleaver for $P$ odd and $mD \equiv -2 \bmod P$.

Figure 5:
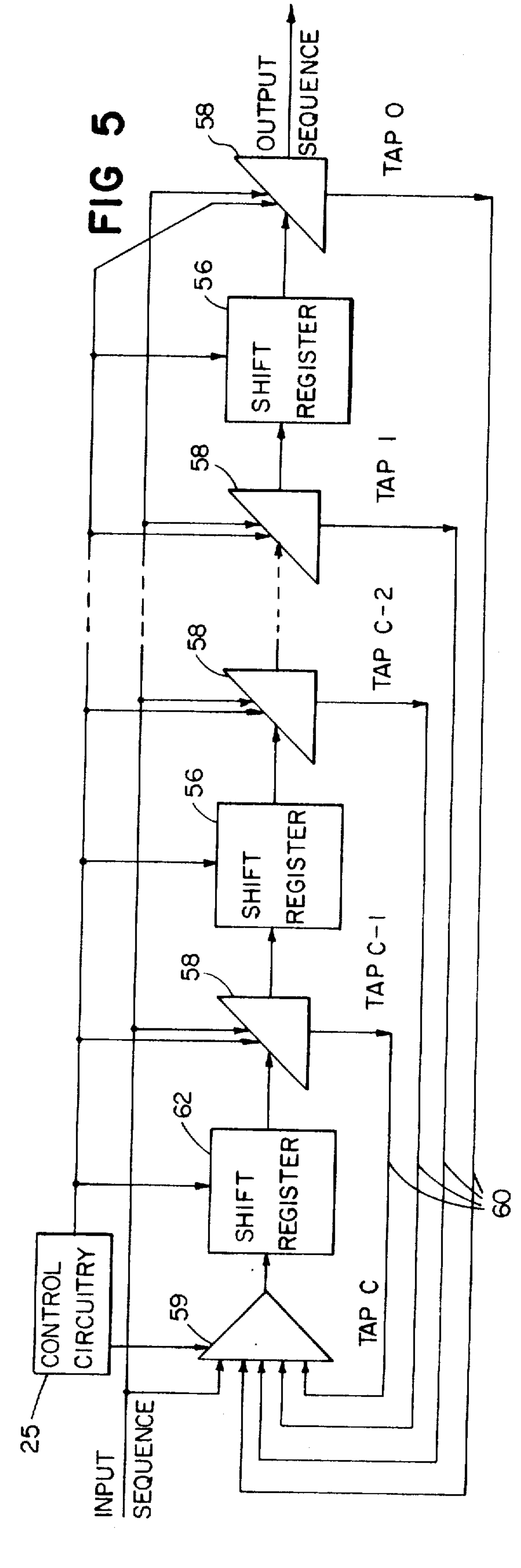

For $P$ even, $D$ must be even. (Since $m$ is relatively prime to $P$, it is odd. Since $mD+1$ is relatively prime to $P$, it is also odd. Thus $mD$ is even; but since $m$ is odd, $D$ is even. Alternatively, we could simply observe that the average delay $(\frac{1}{2})(P-1)D$ must be an integer.) Letting $c=P/2$, a similar interleaver with one shift register 62 of length $D/2$ and $(c-1)$ shift registers 56 of length $D$, as in FIG. 5, can be realized. The rules are identical to those given above. Again modular arithmetic verifies that this is indeed a $(P, D, m)$ interleaver under the condition $mD \equiv -2 \bmod P$, and $P$ even.

Figure 6:
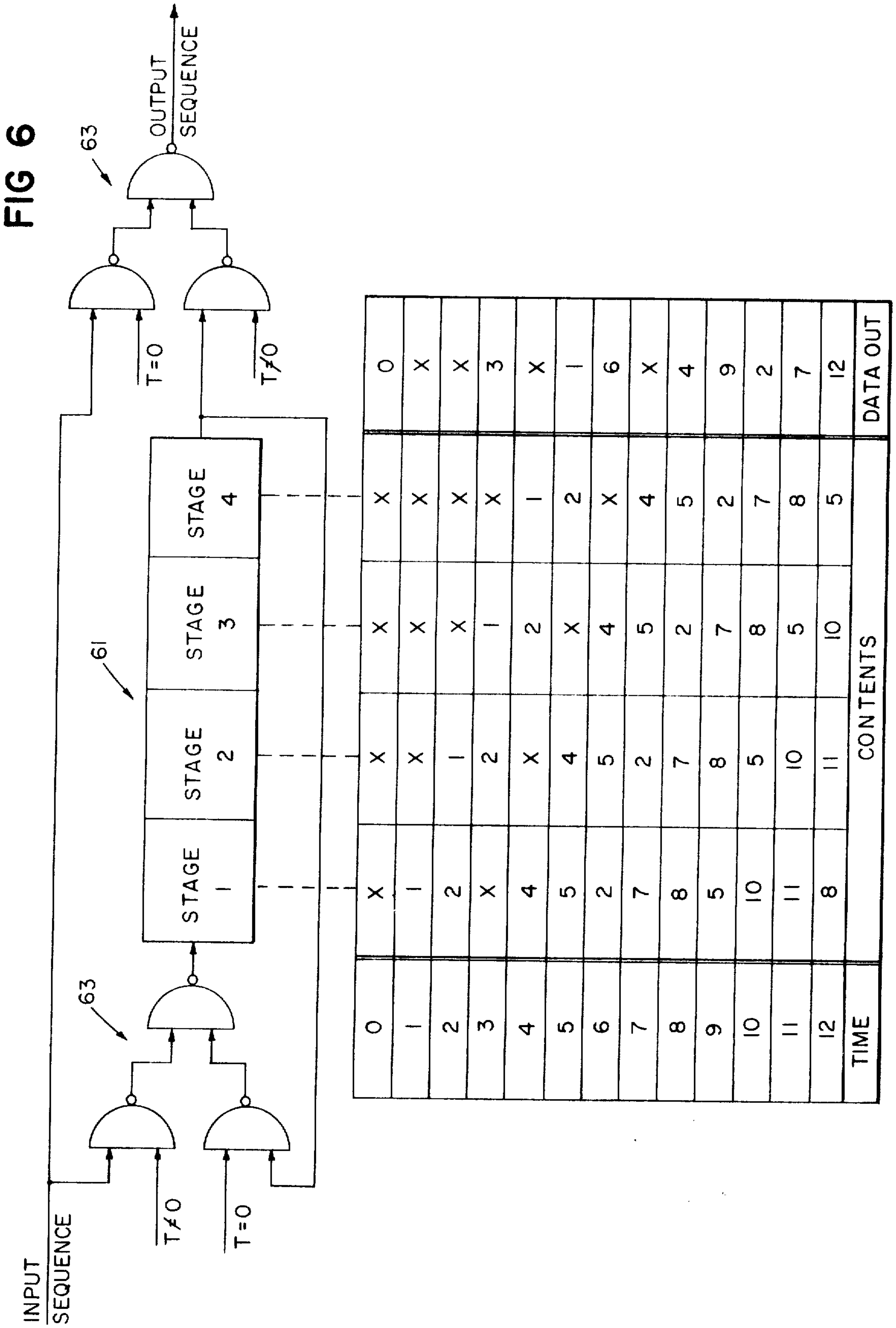
FIG. 6 is a schematic illustration of an interleaver constructed according to the invention and a chart illustrating the operation of the interleaver.
Figure 7A:
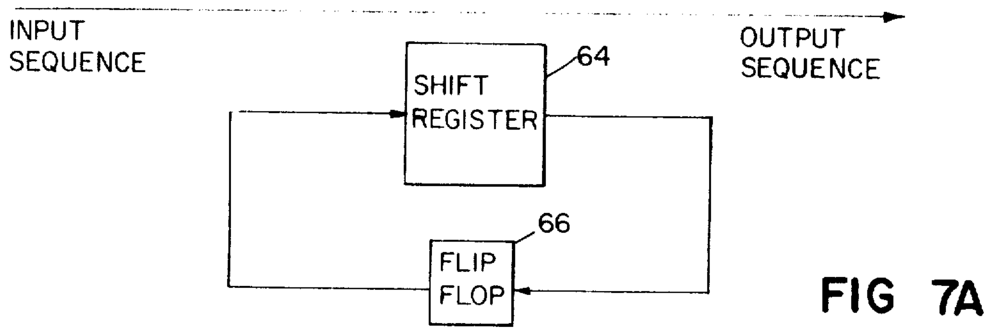
FIGS. 7A through 7D are schematic illustrations which represent steps in the operation of still another embodiment of an interleaver constructed according to the invention.
Figure 7B:
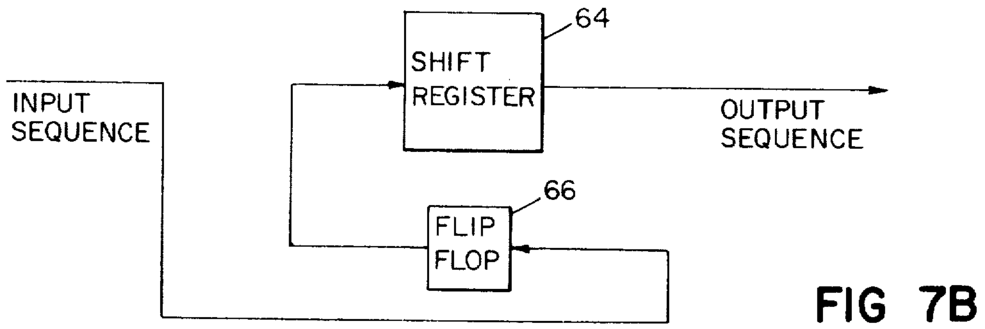
Figure 7C:
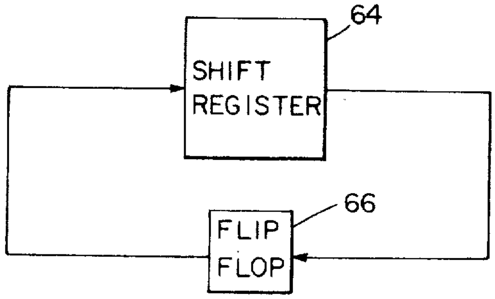
Figure 7D:
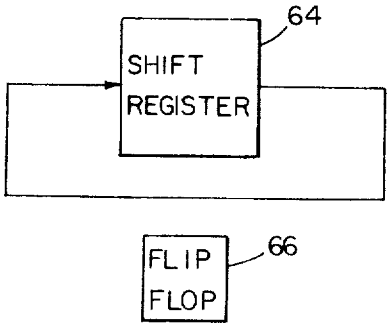

The chart of FIG. 6 illustrates the operation of the example interleaver (therein schematically illustrated where 61 is a four-stage shift register and input signals are inserted before and after it at gating units 63) in which $P$ is equal to 3 and thus odd. With $m=1$ and $D=4$ we verify that $mD \equiv -2 \bmod P$, so the example interleaver is self-inverse. The entries in the chart directly below the shift register indicate the information signals stored in the corresponding register stage at the time given in the first column.

Still more elegant realizations of self-inverse interleavers are possible if we can run a shift clock faster than the data rate. It will now be shown that the interleavers of FIGS. 4 and 5 can be realized with a single long shift register and some associated logic.

First consider an interleaver which simulates the interleaver of FIG. 4. The interleaver of FIG. 4 has a storage capacity (memory) of $cD$ signals. These storage elements may be indexed by the double index $(i, j)$, $1 \leq i \leq c$, $1 \leq j \leq D$, where element $(i, j)$ is the $j$th element in the $i$th shift register, reading from right to left. Thus the leftmost element is $(c, D)$, and the rightmost is $(1, 1)$. The whole sequence of elements from right to left is $[(1, 1), (1, 2),..., (1, D)]$, $[(2, 1),..., (2, D)]$,..., $[(c, 1),..., (c, D)]$.

As shown in FIGS. 7A, 7B, 7C, and 7D, these elements may be rearranged into a shift register 64 of length $cD-1$ and a single flip-flop 66, as follows. Again reading from right to left, the elements in register 64 are $[(1, 1), (2, 1),..., (c, 1)][(1, 2),..., (c, 2)],..., [(1, D),..., (c-1, D)]$. That is, there is first a block of $c$ first elements, then $c$ second elements, and so forth. The last (leftmost) element $(c, D)$ is the flip-flop 66.

A single clock pulse in FIG. 4 shifts the signal stored in element $(i, j)$ to element $(i, j-1)$ for $2 \leq j \leq D$; shifts the signal stored in element $(i, 1)$ to element $(i-1, D)$ if $i \geq 2$ and $i- \neq mt \bmod P$; shifts the signal stored in element $(mt+1 \bmod P, 1)$ to the leftmost location $(c, D)$; shifts the signal stored in element $(1, 1)$ out if $t \neq 0 \bmod P$; and shifts the current input sequence signal to the output if $t=0 \bmod P$, into element $(mt \bmod P, D)$ if $0<mt \bmod P<c$, and into flip-flop 66 if $mt \bmod P>c$.

The same transformation can be effected in FIGS. 7A through 7D in $c$ shifts of the register 64. The shift times are indexed by $i$, $1 \leq i \leq c$; then bit $(i, 1)$ appears at the output of register 64 at time $i$. At time 1 an input sequence signal is taken in and an output sequence signal is put out. The time index $t$ of the embodiment of FIG. 4, $0 \leq t \leq P-1 \bmod P$, now advances once every $c$ shifts, so that clocks really have the double index $(t, i)$. Steps in the operation of the interleaver are illustrated in FIGS. 7A through 7D, as follows:

| FIG. | Time | Connections Established |
|---|---|---|
| 7A | $t=0, i=1$ | input signal to output; (1, 1) to (c, D); (c, D) to (c−1, D) |
| 7B | $t\neq 0, i=1$ | input signal to (c, D); (c, D) to (c−1, D); (1, 1) to output |
| 7C | $i-1\equiv mt \bmod P$, $i\neq 1$ | (1, 1) to (c, D); (c, D) to (c−1, D) |
| 7D | $i-1\not\equiv mt \bmod P$, $i\neq 1$ | (1, 1) to (c−1, D) |

After $c$ shifts, the signal stored at element $(i, j)$ has moved to element $(i, j-1)$ for $2 \leq j \leq D$, including $(c, D) \rightarrow (c, D-1)$. The signal stored in element $(1, 1)$ is stored in element $(c, D)$ if $i-1 \equiv mt \bmod P$. The current input signal becomes the output signal if $t=0 \bmod P$, winds up in $(mt \bmod P, D)$ if $0 <mt \bmod P<c$; and otherwise stays in $(c, D)$ throughout the $c$ shifts. The output signal is taken from $(1, 1)$ when $t \neq 0 \bmod P$. Thus $c$ shifts with these recirculation rules are equivalent to 1 shift in FIG. 4. In summary, instead of $c$ $D$-bit registers clocked at the signal rate, a single register of length $cD-1$ plus a flip-flop, clocked at $c$ times the signal rate, can be used.

Similarly, the interleaver of FIG. 4 can be considered to be composed of $P-1$ $(D/2)$-bit segments, and an equivalent interleaver can be constructed out of a single shift register, SR, of length $(P-1)(D/2)-1$ plus a flip-flop, F, clocked at $P-1$ times the data rate. Again time is indexed by $(t, i)$, $0 \leq t \leq P-1$, $1 \leq i \leq P-1$, and the following recirculation rules are adopted:

| Time | Connections Established |
|---|---|
| $i=1, t=0$ | end of SR to F; F to start of SR; input signal to output. |
| $i=1; t\neq 0$ | end of SR to output; input to F; F to start of SR. |
| $i$ odd, $\neq 1$; $(i-1)/2\equiv mt \bmod P$ | end of SR to F; F to start of SR. |
| $i$ even | end of SR to start of SR. |

The advantages of these interleavers may be briefly summarized as: unlimited choice in $P$; practically unlimited choice in $D$ (for $D>P$); near optimal characteristics ($P\times D$ or $D\times P$ interleaving, minimum storage capacity, minimum guard space); use of storage (memory) in a few long units of equal size or in a single long unit; self-inverse (so that the same interleaver can be used at transmitter and receiver); and relatively little associated logic.

Figure 8:
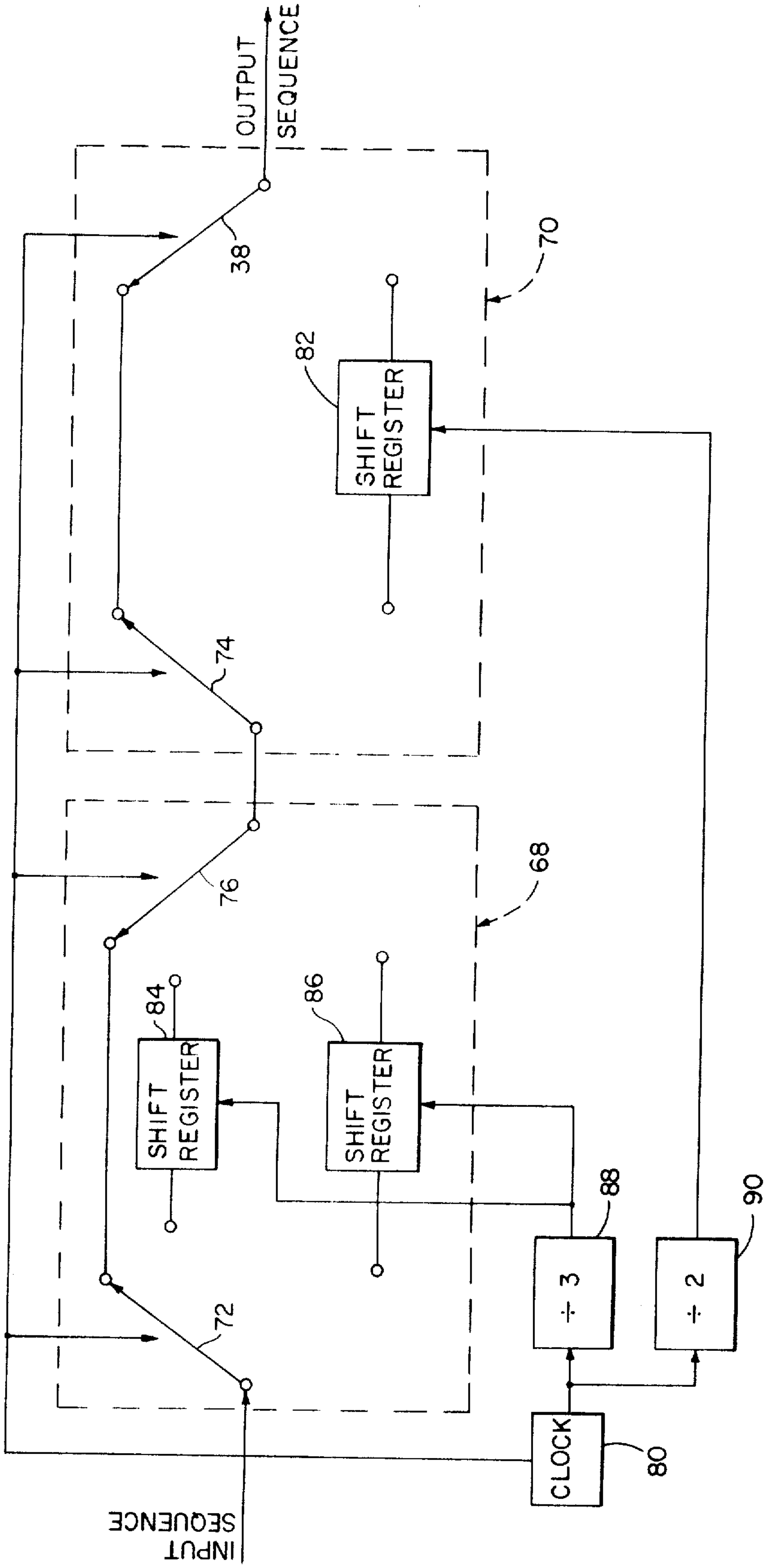

Finally, a cascaded interleaver with $P=6$ is schematically illustrated in FIG. 8 where 68 and 70 refer to the two interleaver stages. Each stage includes a decommutator (72 and 74, respectively) and a commutator (76 and 78, respectively) clocked at the basic clock rate of clock 80. Shift registers 82, 84, and 86 have capacities related by the following ratio: 3:4:8. Units 88 and 90 divide the clock rate by three and two respectively. Registers 84 and 86 are driven at one-third clock rate and register 82 is driven at one-half clock rate.

From the foregoing analyses and descriptions of preferred embodiments it will be apparent to one skilled in the art that my invention encompasses other embodiments, which are within the following claims.

What is claimed is:

1. Apparatus for interleaving an input sequence of information signals so that any two input signals separated by B or fewer signals will be separated by N or more signals in an output sequence, comprising control circuitry and delaying circuitry of predetermined storage capacity, defining a number P of delay paths, P having a value of at least 2 and less than BN/2, each path having a fixed length equal to a predetermined number of intervals of said input sequence, certain of said paths being longer than other of said paths, said control circuitry including means to classify any P successive information signals respectively to the P different delay paths in accordance with a fixed, predetermined order, the signals classified to each path being spaced a period of P intervals apart, and means to deliver an output sequence of information signals derived from the various delay paths, P being the least common multiple of $P_1, P_2 \ldots P_n$, said apparatus comprising a cascade of $n$ constituent interleavers having periods $P_1, P_2 \ldots P_n$.

2. The apparatus of claim 1 wherein the delay paths in one constituent interleaver have lengths approximately equal to 0, D, 2D,..., $(Q_1-1)D$ and the delay paths of the second constituent interleaver have lengths approximately equal to 0, $Q_1D$, $2Q_1D$,..., $(Q_2-1)Q_1D$ where the product of $Q_1$ and $Q_2$ is P.

3. The apparatus of claim 1 wherein said delaying circuitry comprises at least two stages of delay circuits connectable in cascade such that delay circuits of the first stage are periodically connected to delay circuits of the second stage.

4. Apparatus for interleaving an input sequence of information signals so that any two input signals separated by B or fewer signals will be separated by N or more signals in an output sequence, comprising control circuitry and delaying circuitry of predetermined storage capacity, defining a number P of delay paths, P having a value of at least 2 and less than BN/2, each path having a fixed length equal to a predetermined number of intervals of said input sequence, certain of said paths being longer than other of said paths, at least two of said delay paths extending through a common portion of said delaying circuitry, said control circuitry including means to classify any P successive information signals respectively to the P different delay paths in accordance with a fixed, predetermined order, the signals classified to each path being spaced a period of P intervals apart, and means to deliver an output sequence of information signals derived from the various delay paths.

5. The apparatus of claim 4 wherein said delaying circuitry includes storage means comprising an extended length of signal storage positions through which information signals progress.

6. The apparatus of claim 5 wherein said storage means comprises a number of storage elements each having an extended length of untapped signal storage positions through which information signals progress.

7. The apparatus of claim 6 wherein the majority of said storage elements have equal length.

8. The apparatus of claim 5 wherein said storage means comprises a shift register.

9. The apparatus of claim 4 wherein said control circuitry defines said delay paths by establishing at least two sets of connections between storage elements of said delaying circuitry and said input and output terminals.

10. The apparatus of claim 9 wherein at least one of said connections is a feedback connection such that at least one information signal passes through the same storage element of said delaying circuitry twice, enabling a delay path to be defined which is longer than the overall delay of said delaying circuitry.

11. The apparatus of claim 9 wherein said delaying circuitry has a common input or output terminal.

12. The apparatus of claim 6 wherein said delaying circuitry comprises P separate shift registers, one of which may have length zero, and said control circuitry comprises means for separating said input sequence into P different subsequences, passing each subsequence through a different said shift register, and recombining the outputs of said shift registers to form said output sequence.

13. The apparatus of claim 6 wherein said delaying circuitry comprises at least one untapped shift register, and said control circuitry comprises a sequential circuit of period P arranged to cycle in synchronism with said input information sequence through P distinct states and gating means responsive to said states arranged to form P distinct connection patterns between the input and output terminals of said register or registers and the input and output terminals of the interleaving apparatus.

14. The apparatus of claim 13 wherein said delaying circuitry consists of P−1 untapped shift registers of equal length arranged in a single chain, and said connection patterns include beyond the chain patterns only connections from said input terminal of said apparatus to some said shift register input and from said output terminal of said apparatus to some said shift register output.

15. The apparatus of claim 13 wherein said delaying circuitry consists of (P−1)/2 untapped shift registers of equal length arranged in a single chain, and (P−1)/2 of said connection patterns involve feedback.

16. The apparatus of claim 5 wherein said delaying circuitry comprises one long untapped shift register and a second storage element, said second element having much smaller storage capacity than said long register, and said control circuitry includes means for clocking said long register more than once upon the arrival of each said information signal.

17. The apparatus of claim 16 wherein said second storage element is a single flip-flop.

* * * * *